United States Patent [19]

Grazioli

[11] Patent Number: 5,512,227
[45] Date of Patent: Apr. 30, 1996

[54] METHOD FOR MAKING A GRAPHIC REPRESENTATION ON POLYOLEFIN

[75] Inventor: Vittorio Grazioli, Asola, Italy

[73] Assignee: Grazioli S.P.A., Mosio di Acquanegra, Italy

[21] Appl. No.: 250,759

[22] Filed: May 26, 1994

[30] Foreign Application Priority Data

Jun. 1, 1993 [IT] Italy ................... MI93A1147

[51] Int. Cl.⁶ .................................................. B29C 45/14
[52] U.S. Cl. .................... 264/132; 264/265; 264/275; 264/291
[58] Field of Search ................... 264/132, 259, 264/265, 22, 275, 291; 156/229, 277

[56] References Cited

U.S. PATENT DOCUMENTS

| | | | |
|---|---|---|---|
| 3,122,598 | 2/1964 | Berger | 264/132 |
| 3,654,062 | 4/1972 | Loew | 264/259 |
| 4,795,597 | 1/1989 | Whiteley et al. | 264/259 |
| 5,227,222 | 7/1993 | Ogawa et al. | 264/132 |
| 5,254,302 | 10/1993 | Yamanaka et al. | 264/291 |
| 5,334,450 | 8/1994 | Zabrocki et al. | 156/196 |

FOREIGN PATENT DOCUMENTS

| | | | |
|---|---|---|---|
| 60-34834 | 2/1985 | Japan | 264/132 |
| 1227473 | 4/1971 | United Kingdom | 264/265 |

OTHER PUBLICATIONS

"In Mold Decoration", *Plastics World*, Feb., 1963, pp. 24–25, W. L. Hochner.

*Primary Examiner*—Robert B. Davis
*Attorney, Agent, or Firm*—Herbert Dubno

[57] ABSTRACT

A graphic representation is made on objects made of a polyolefin polymer by printing a graphic representation on a face of a first film made of a stretched polyolefin polymer, associating the first film with a second film having a lower melting point than that of the first film, in order to obtain a membrane formed by the associated first and second films containing the graphic representation between them. The membrane is transferred into an injection mold and a polyolefin polymer is injected into the mold for forming the object, thereby obtaining at least a partial melting of the second film so that the membrane forms one body with the object.

14 Claims, 2 Drawing Sheets

METHOD FOR MAKING A GRAPHIC REPRESENTATION ON POLYOLEFIN

FIELD OF THE INVENTION

My present invention relates to a method of and to an apparatus for making graphic representations on objects made of a polyolefin polymer and to a polypropylene membrane for implementing the method.

BACKGROUND OF THE INVENTION

As is known, currently, for reproducing a graphic representation on a plastic object, for example on an object made of a polyolefin polymer, such as polyethylene or polypropylene, a film is printed with a known printing system (rotogravure or flexographic printing), the film being of, for example, a polyolefin polymer which after the printing operation is manually introduced into a mold.

Subsequently plastic (e.g. polyethylene or polypropylene) is injected into the mold for producing the desired object.

Drawings, signs and the like are currently printed by this method on small objects commonly in use.

This method has a considerable disadvantage in that the film perfectly integrates in the object on which it is applied only in the regions which are not printed, while on the printed film surface, the film only rests on the object surface because the printing inks that constitute a barrier to the molecular penetration between the film and the material constituting the object.

This is the direct consequence of the fact that both polyethylene and the polypropylene, in order to be printed, require a flame surface treatment or high frequency electric discharge (corona effect) surface treatment, before printing with ink. For improving the adhesion of the inks it is also possible to use a hot chemical etching with a highly oxidizing solution, such as chromic acid, oleum, and chlorosulphonic acid.

As has been indicated, the ink creates a "barrier" so that printed portions of both polyethylene and the polypropylene adhere to the material which is cast against the film.

This inconvenience causes the graphic representation to detach especially when the printed portion of the film is subjected to an abrasive action or denting.

Furthermore, the described method only allows printing of small graphic designs on small objects.

In fact, the greater the size of the design, the greater are the chances of its detachment from the object.

The larger is the design, the more difficult it is to arrange it inside the mold, especially if this operation is performed mechanically.

In order to obviate the above drawbacks another type of transfer is used for transferring a design on a plastic object.

To this purpose, by means of a calender for thermoprinting, the colors are transferred from paper to the surface of the object to be printed.

This system also allows printing of a design only on small objects and can be used only with substantially planar surfaces. It is also so expensive that its use is limited to selected and limited cases.

OBJECTS OF THE INVENTION

It is the object of the present invention to obviate the aforedescribed drawbacks.

Another important object of the invention is to provide a method of and an apparatus for making a graphic representation on objects made of a polyolefin polymer, wherein the graphic representation (printed and unprinted portions) is totally integrated with the material of the object on which the design has to be printed by an effective molecular integration.

A further important object of the invention is to provide a method of and an apparatus for making graphic representations on objects made of a polyolefin polymer which are extremely economical and which ensure a long durability of the representation.

A further object of the invention is to provide a method of and an apparatus, for making a graphic representation on objects made of a polyolefin polymer which can be used without any problem for large graphic representations in toys, outdoor seats and tables, etc.

A further object of the invention is to provide a method of and an apparatus for making a graphic representation on objects of a polyolefin polymer, which can be used in existing productions lines without substantial modifications.

Still another object of the invention is to provide a method of and an apparatus for making a graphic representation on objects of a polyolefin polymer, which allow an easy and durable application on an object, for example made of polypropylene, capable of withstanding thermal, mechanical and physical actions without detriment even after a long time.

SUMMARY OF THE INVENTION

The above and other objects of the invention are achieved by a method of making a graphic representation on objects made of a polyolefin polymer, which comprises printing a graphic representation on a face of a first film made of a stretched polyolefin polymer, associating the first film with a second film having a melting point lower than that of said first film, in order to obtain a membrane formed by said associated first and second films containing said graphic representation between them, transferring said membrane inside an injection mold and injecting a polyolefin polymer in the mold for forming the object, obtaining at least a partial melting of said second film in order that said membrane forms a unitary body with the injection molded object.

The method is carried out by an apparatus for making a graphic representation on objects made of a polyolefin polymer which comprises grip means for transferring the perfectly tense membrane to the mold, and means for electrostatically charging the membrane for a perfect adhesion of the membrane to the mold.

Conveniently, the polypropylene membrane for making a graphic representation on objects made of a polyolefin polymer comprises a first film as a bioriented polypropylene film, the graphic representation being printed on one face of the first film. The first film is associated, through an adhesive, with a second film, in unstretched polypropylene, having a melting point lower than the melting point of the first film, at least the first film having adapted additives for improving its resistance to ultraviolet rays.

The present invention also includes to an injection molded object comprising an external layer formed by a polyolefin film, a first lower layer formed by at least one ink adapted to define a graphic representation, a second lower layer formed by an adhesive polymer, a third lower layer formed by a polyolefin polymer having a melting point lower than that of the first layer, said third layer adhering by melting to the body of said printed object.

BRIEF DESCRIPTION OF THE DRAWING

The above and other objects, features, and advantages will become more readily apparent from the following description, reference being made to the accompanying drawing in which.

SPECIFIC DESCRIPTION AND EXAMPLES

Figure 1:
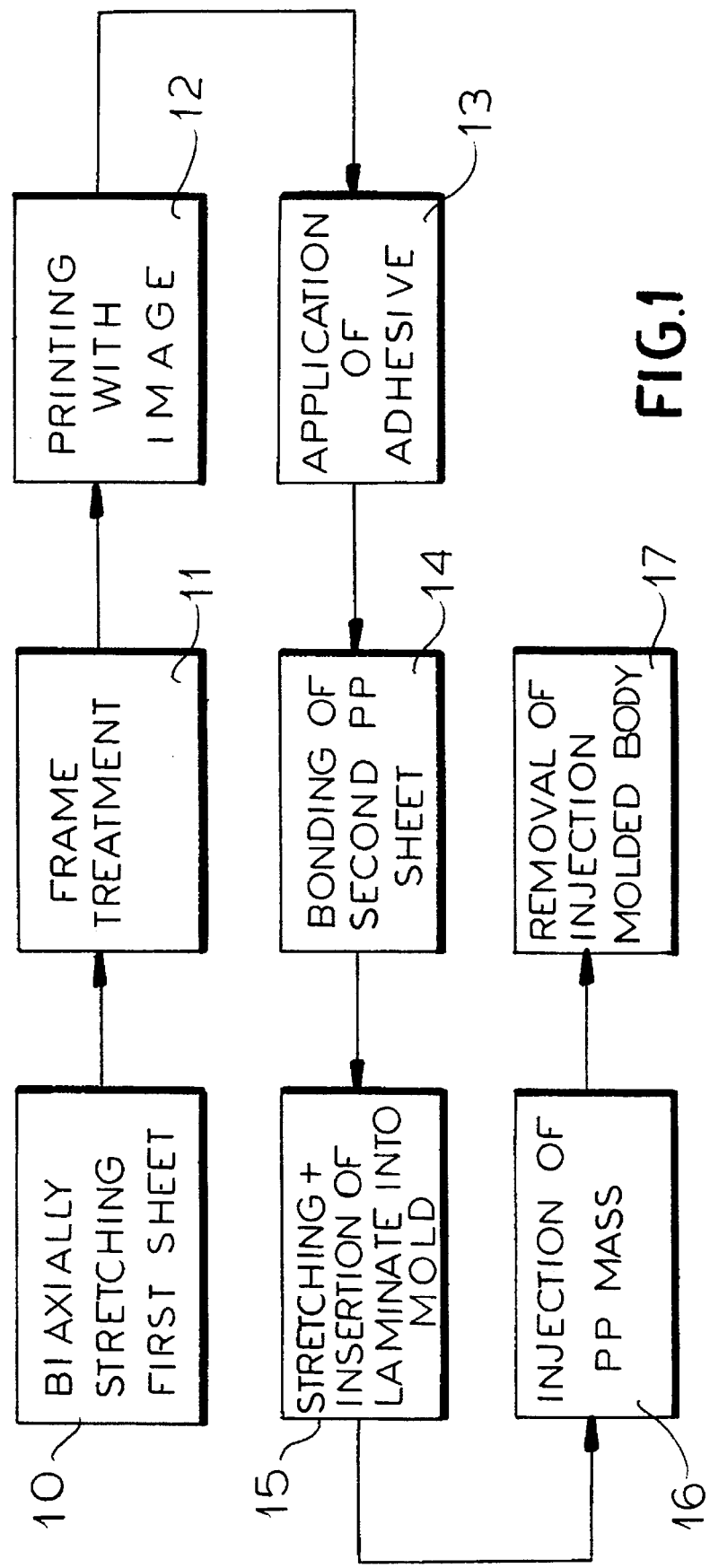
FIG. 1 is a block diagram illustrating the method of the invention.

While the invention will be described in greater detail below, with reference to FIG. 1 it can be seen that an initial step is bidirectionally orienting a first sheet of polyolefin at and subjecting the first sheet to flame treatment at 11 to render the treated surface amendable to printing. The treated surface is then printed at 12 with the desired image or graphic representation and the surface which has been printed then receives an application at 13 of an adhesive to enable a second polyolefin sheet to be bonded thereto at 14.

Figure 3:
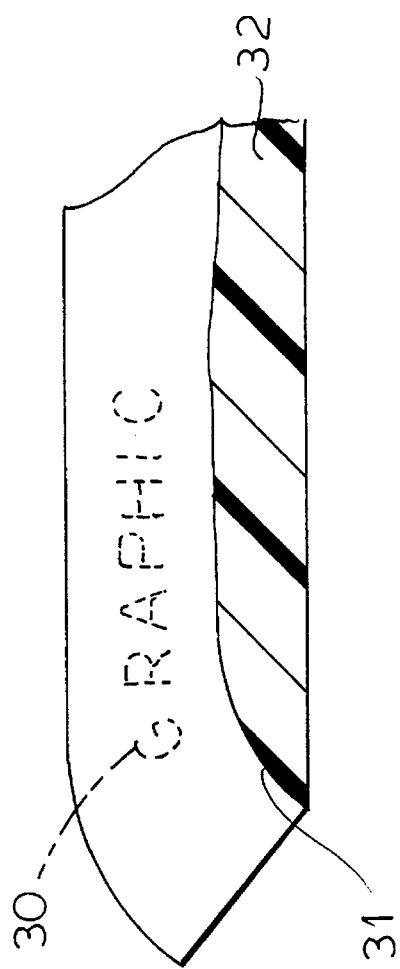
FIG. 3 is a cross sectional view in perspective showing an object made by the method of the invention.

The resulting laminate is tensioned (as shown at 15) and placed in a mold, whereupon a polypropylene mass is injected at 16 into the mold. Upon removal of the injection molded body at 17, a product such as that shown in FIG. 3 can be obtained where the graphic representation 30 is visible through the transparent first sheet of the two-sheet membrane 31 lining the body 32 of injection-molded material.

Figure 2:
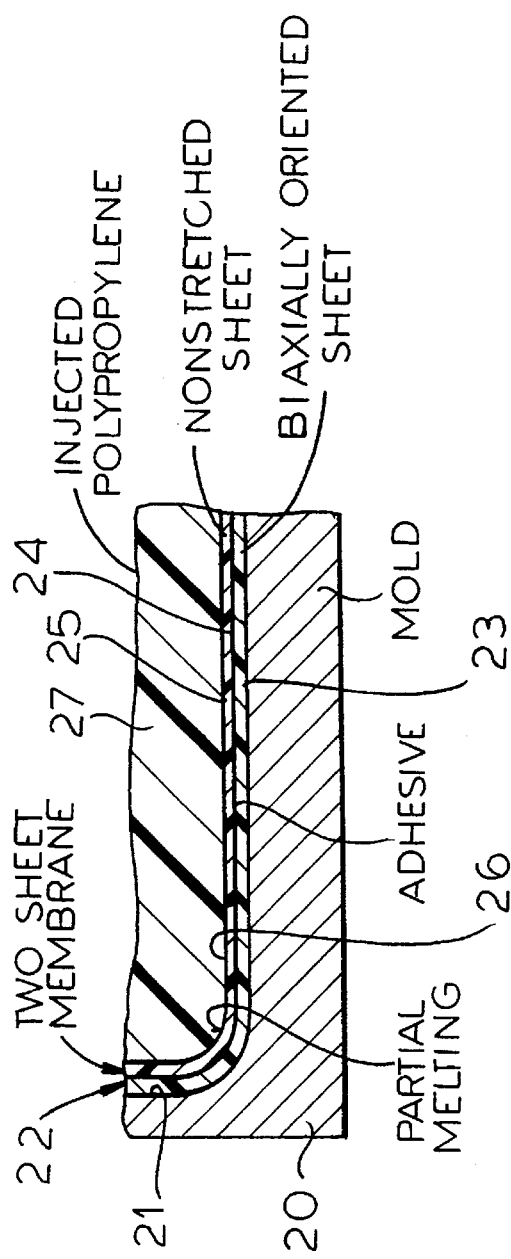
FIG. 2 is a cross sectional view illustrating an aspect of the invention.

In FIG. 2, I have shown the mold 20 with its mold cavity 21 lined with the two-sheet membrane 22 which comprises a first sheet 23 bearing the graphic representation along its inner surface, a layer 24 of adhesive and the nonstretched sheet 25 which is partially molded at its surface 26 in contact with the injection-molded polypropylene 27.

Further characteristics and advantages of the invention will be more apparent by the description of a preferred but not exclusive embodiment of a method and an apparatus for making a graphic representation on objects made of a polyolefin polymer, wherein the method, according to the invention, is performed by the following succession of steps.

First, the film, having selected size and height, is extruded from the starting material generally constituted by granulated polypropylene.

Then, the film is stretched in two directions, of which one is the (longitudinal) extruding direction and the other one is the (transverse) direction at a right angle to the longitudinal direction.

This film is flame treated in order to ensure the adhesion of ink and/or adhesives.

Then the graphic representation, which will eventually be transferred to the object to be decorated, is printed on the first film.

This printing is performed in a per se known manner by rotogravure or flexographic printing.

It is pointed out that, before extrusion, the starting material, which can be granulated or powder polypropylene, is stabilized with specific additives adapted to project the polymer from the action of atmospheric oxygen and from solar light.

Thanks to these additives, the film resistance to thermal aging and to the light improves from about 1–2 months to about 2–3 years.

By means of a polyurethane adhesive, which is also protected from ultraviolet rays for preventing it from yellowing, the first bioriented film is associated with a second unstretched polypropylene film, having a lower melting point than that of the first film.

In particular, the polyurethane adhesive is protected from UV rays thanks to the inclusion of specific additives belonging to the monomeric HALS class and preferably to the monomeric methyl-hindered PEALS class.

In this manner, the associated first and second films form a membrane containing the graphic representation between the films, the graphic representation being thus perfectly protected both above and below.

The application of the second polypropylene film to the first film provides two advantages.

On one hand, it makes the printing ink adhere to and cover the object completely eliminating the inconvenience of the prior art in that region where the polypropylene film did not adhere to the object.

The second advantage is that, since the second film has a lower melting point than that of the first film, during injection of the material (for example polypropylene) for forming the object, the second film tends to at least partially melt thereby providing a perfect integration of the second film molecules with the injected polypropylene.

Namely, the melting point of the second film is comprised between 120° C. and 170° C., while the melting point of the first film is comprised between 120° C. and 190° C. Preferably, the melting point of the second film is comprised between 145° and 150° C., while the melting point of the first film is comprised between 160° C. and 165° C.

In particular, after the membrane has been obtained in the above described manner, the membrane is dinked in the desired size. The desired graphic representation is then grabbed and kept perfectly stretched and, before being applied to the mold, it is electrostatically charged.

The electrostatic charge makes the membrane adhere inside the mold perfectly, so that it assumes the same shape, even if the mold does not have a perfectly plane surface, but rather has lowered and raised regions according to the object to be molded.

Of course, the membrane has the first film against the mold while the second film is inside the mold go that it is affected by the injected polypropylene, not directly on the membrane, but indirectly in order not to spoil or move the membrane from its position.

EXAMPLE 1

The first film is constituted by a high rigidity bioriented homopolymer polypropylene having a melting point of 163° C. and conveniently stabilized with a monomeric and polymeric HALS mixture.

The first film is superficially flame treated for rendering it printable and is printed by a flexographic process and with inks having high resistance to the light.

The first film is spread with a polyurethane adhesive added with a a monomeric methyl-hindered HALS mixture for improving the resistance to light.

The first film, printed and glued, is then glued to the second film constituted by random copolymer polypropylene having a melting point of 148° C.

The membrane, thus formed, after a time sufficient for the adhesive reticulation, is dinked for obtaining the exact shapes to be inserted into the mold.

EXAMPLE 2

Example 1 is repeated with the addition of a further protection against the aging process of the polyurethane adhesive (yellowing) due to direct exposure to UV rays. The further protection is obtained during the printing step of the graphic representation, by covering all the remaining regions of the first film which are not affected by the graphic representation, with an ink having the same color as the object on which the membrane is applied.

In this manner, the polyurethane adhesive, between the two films, is not directly exposed to the solar light.

The present invention also relates an apparatus for the application of the above described membrane.

Namely, the apparatus comprises grip means, for example with holes or suckers for sucking air, for grabbing the perfectly stretched membrane and moving it to the mold.

The same support plate of the grip means, kinematically operated by numeric control, according to the known art, advantageously comprises means for electrostatically charging the membrane so that the membrane may perfectly adhere to the mold in which it is arranged.

Also the means for electrostatically charging may be any as long as it charges the membrane sufficiently for the above described requirements.

The present invention also relates to the polypropylene membrane for implementing the above described method.

The polypropylene membrane comprises as the first film in a bioriented polypropylene film. By known techniques, a graphic representation, to be associated with any injection molded object in polypropylene (for example outdoor tables, seats, toys, and similar) is printed on one face of the first film. The first film, in bioriented polypropylene, is associated with a second film, in unstretched polypropylene, by an adhesive which can be a polyurethane adhesive. Advantageously, the second film has a lower melting point than the melting point of the first film, so that it can partially melt when the polypropylene, injected inside the mold, makes contact with the second film.

Advantageously, both the first film and the adhesive are stabilized with adapted additives for improving their resistance to the thermal aging and to the action of the light, particularly of the ultraviolet rays.

The second film has a melting point which is substantially lower than the temperature of the polyolefin polymer, adapted to form the object on which the graphic representation has to be applied, when the polyolefin polymer makes contact with the second film, during the injection into the mold.

The invention achieves the intended aims and has important and considerable advantages.

It has in fact being devised a new method for making a graphic representation on objects made of a polyolefin polymer; the method achieves a perfect integration of the graphic representation support membrane with the object surface.

Furthermore, the membrane applied in this manner is considerably durable and is resistant to possible scratches and abrasions.

The invention thus conceived may have numerous modifications and variations, all within the inventive concept.

For example, advantageously, for obtaining a further protection against the aging process of the polyurethane adhesive (yellowing) due to direct exposure to UV rays, during the printing step of the graphic representation, all the remaining regions of the first film which are not affected by the graphic representation, are covered with an ink having the same color of the object on which the membrane is applied.

In this manner, the polyurethane adhesive, between the two films, is not directly exposed to the solar light.

Furthermore, all the details may be substituted with technically equivalent elements.

The materials employed, as well as the dimensions, may be any according to the specific needs and the state of the art.

I claim:

1. A method of making an injection-molded object having a graphic representation thereon, comprising the steps of:
   (a) printing a graphic representation on a surface of a first film of a stretched polyolefin polymer;
   (b) bonding a second film having a melting point lower than said first film to said surface to form a membrane from said first and second films with said graphic representation between them;
   (c) applying said membrane to an injection-molding mold with said first film in contact therewith; and
   (d) injection molding a polyolefin polymer into said mold and against said second film, thereby partially melting said second film and bonding said membrane to the injection-molded polymer and forming said body with said graphic representation thereon and located thereon beneath said first film.

2. The method defined in claim 1 wherein said first film is polypropylene and said first film is longitudinally and transversely stretched, said second film being substantially unstretched polypropylene.

3. The method defined in claim 2, further comprising the step of incorporating into said first film additives for improving resistance to atmospheric oxygen and solar light.

4. The method defined in claim 1 wherein said second film has a melting point substantially lower than a temperature of the injected polymer upon contact of the injected polymer with said second film in said mold.

5. The method defined in claim 1, further comprising the step of interposing an adhesive between said films to bond said second film to said first film, said adhesion containing an additive affording protection from ultraviolet.

6. The method defined in claim 1, further comprising the step of electrostatically charging said membrane prior to applying said membrane to said mold.

7. The method defined in claim 5 wherein said adhesive has a monomeric HALS mixture added thereto.

8. The method defined in claim 1 wherein the melting point of said first film is between 120° and 190° C.

9. The method defined in claim 8 wherein the melting point of said first film is between 140° and 175° C.

10. The method defined in claim 9 wherein the melting point of said first film is between 160° and 165° C.

11. The method defined in claim 1 wherein the melting point of said second film is between 120° and 190° C.

12. The method defined in claim 11 wherein the melting point of said second film is between 135° and 170° C.

13. The method defined in claim 12 wherein the melting point of said second film is between 145° and 150° C.

14. The method defined in claim 1 wherein said surface is covered with an ink where not imprinted with said graphic representation of the same color as the injection-molded polymer.

* * * * *